United States Patent
Guemmer

(10) Patent No.: US 8,403,621 B2
(45) Date of Patent: Mar. 26, 2013

(54) BLADE VARIATION IN DEPENDENCE OF THE DEGREE OF THROTTLING ON FLUID-FLOW MACHINE

(75) Inventor: Volker Guemmer, Mahlow (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 993 days.

(21) Appl. No.: 12/076,088

(22) Filed: Mar. 13, 2008

(65) Prior Publication Data
US 2008/0226439 A1 Sep. 18, 2008

(30) Foreign Application Priority Data
Mar. 13, 2007 (DE) .................. 10 2007 012 119

(51) Int. Cl.
F01B 25/06 (2006.01)
(52) U.S. Cl. .................. 415/1; 415/17; 415/23
(58) Field of Classification Search .................. 415/159, 415/160, 161, 17, 23, 47, 49, 1; 60/602, 60/603, 773
See application file for complete search history.

(56) References Cited

U.S. PATENT DOCUMENTS

| | | | | |
|---|---|---|---|---|
| 3,858,390 A | * | 1/1975 | Jansen et al. | 60/786 |
| 4,184,327 A | * | 1/1980 | Cornett et al. | 60/240 |
| 4,405,290 A | | 9/1983 | Rannenberg | |
| 5,692,879 A | * | 12/1997 | Charbonnel | 415/159 |
| 5,927,939 A | * | 7/1999 | Harada et al. | 415/17 |
| 5,947,680 A | * | 9/1999 | Harada et al. | 415/17 |
| 6,233,934 B1 | * | 5/2001 | Church et al. | 60/602 |

FOREIGN PATENT DOCUMENTS

| | | |
|---|---|---|
| DE | 2002658 | 8/1971 |
| DE | 3343284 | 6/1985 |
| DE | 4216033 | 9/1993 |
| DE | 19901509 | 7/2000 |
| DE | 102004025628 | 12/2005 |
| GB | 2264984 | 9/1993 |

OTHER PUBLICATIONS

German Search Report dated Nov. 29, 2010 from counterpart application.
German Search Report dated Dec. 9, 2010 from counterpart application.
Wayne Sexton, Master's Thesis, "A Method to Control Engine Starting by Varying Compressor Surge Valve Bleed", May 14, 2001.

* cited by examiner

*Primary Examiner* — Edward Look
*Assistant Examiner* — Jason Davis
(74) *Attorney, Agent, or Firm* — Timothy J. Klima; Shuttleworth & Ingersoll, PLC

(57) ABSTRACT

A method for the variation of at least one blade row of a fluid-flow machine, in which, in dependence of the actual operating point, in addition to an aerodynamic speed, at least one further quantity pertinent to the position of the operating point in the family of characteristics of the fluid-flow machine is employed for control.

16 Claims, 14 Drawing Sheets

Figure 1A:
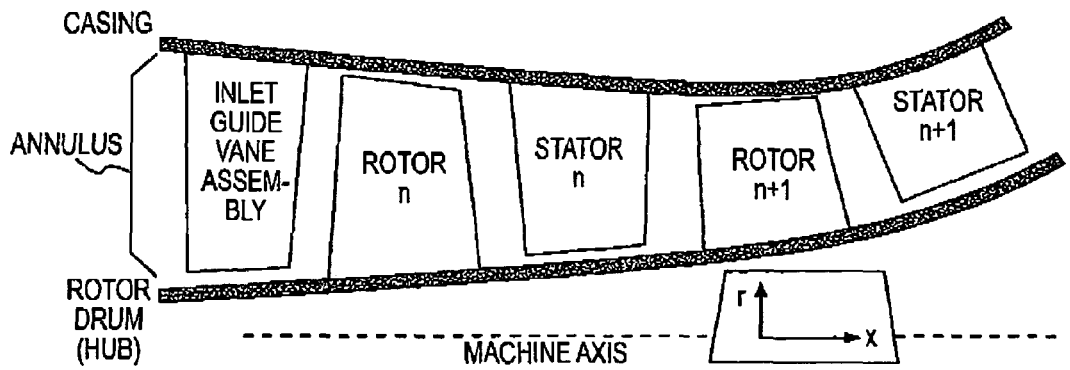
Figure 1B:
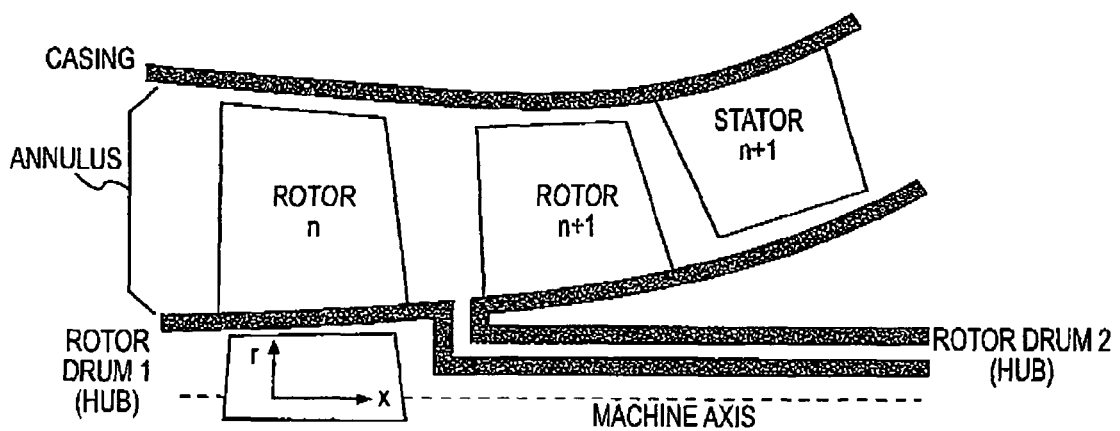
Figure 1C:
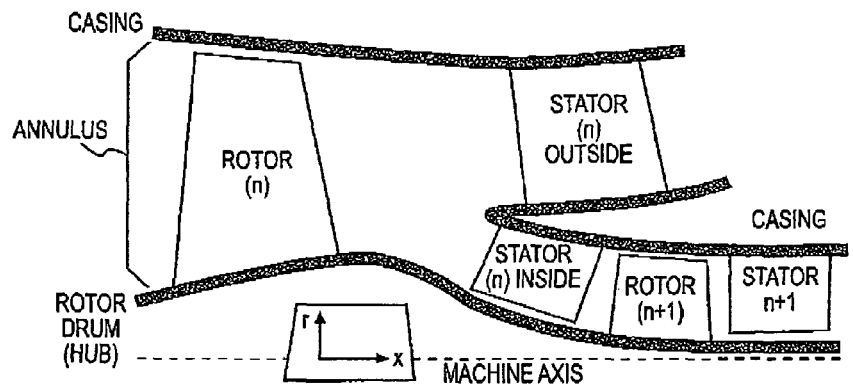
Figure 1D:
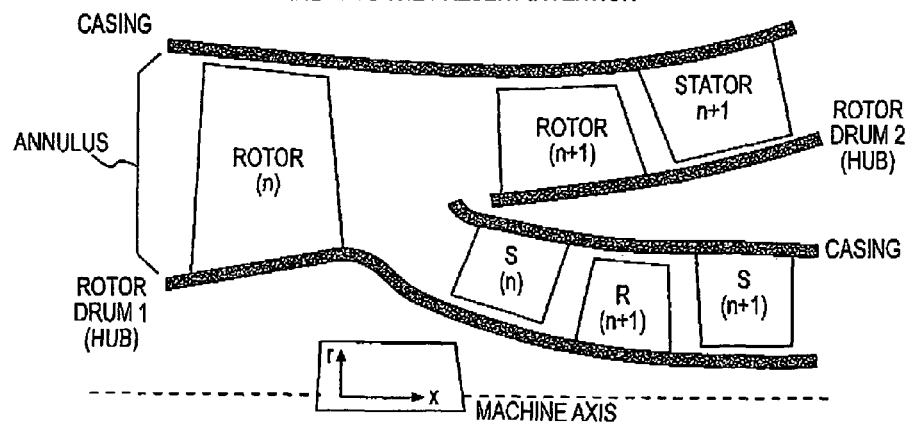

POSSIBLE CONFIGURATIONS OF FLUID-FLOW MACHINES PERTINENT TO THE PRESENT INVENTION

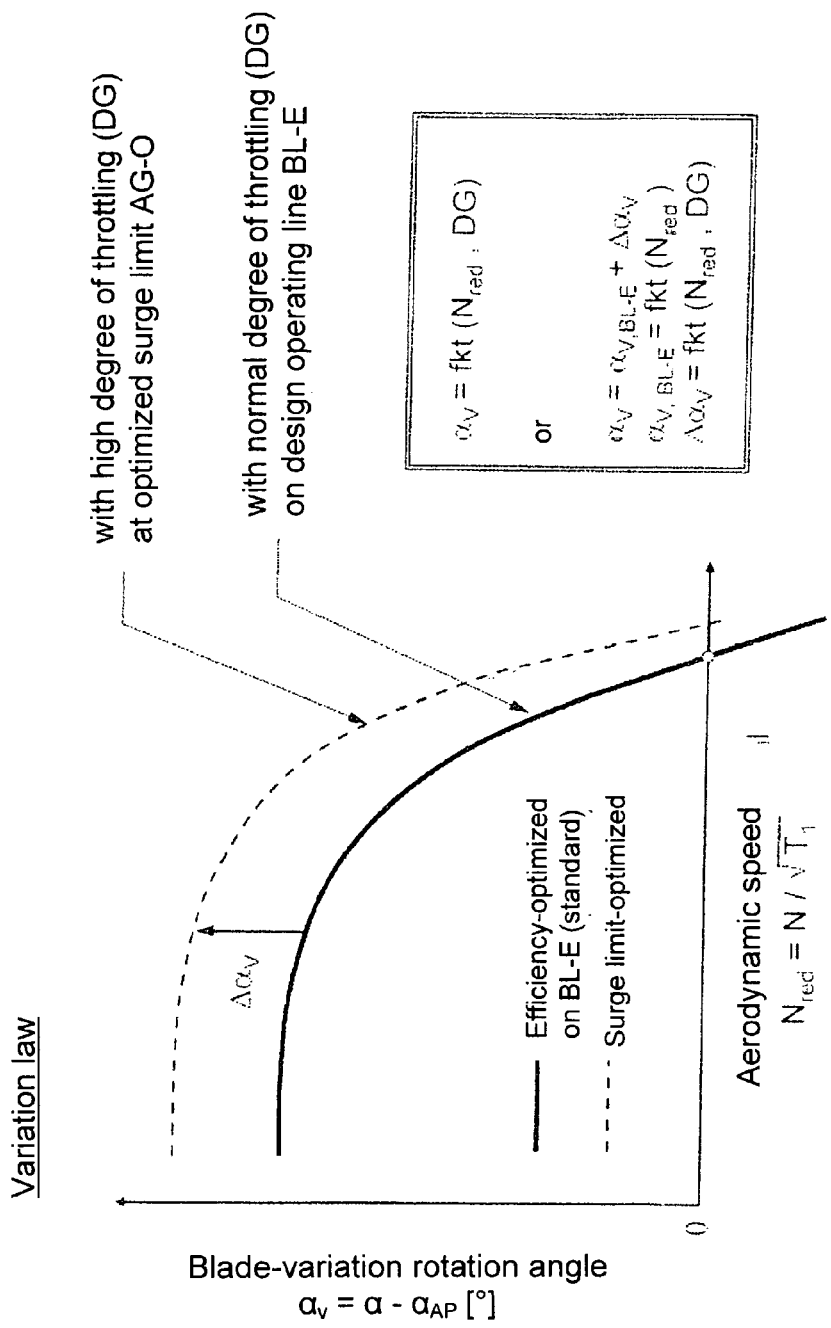
Fig. 3b: Solution according to the present invention, blade variation

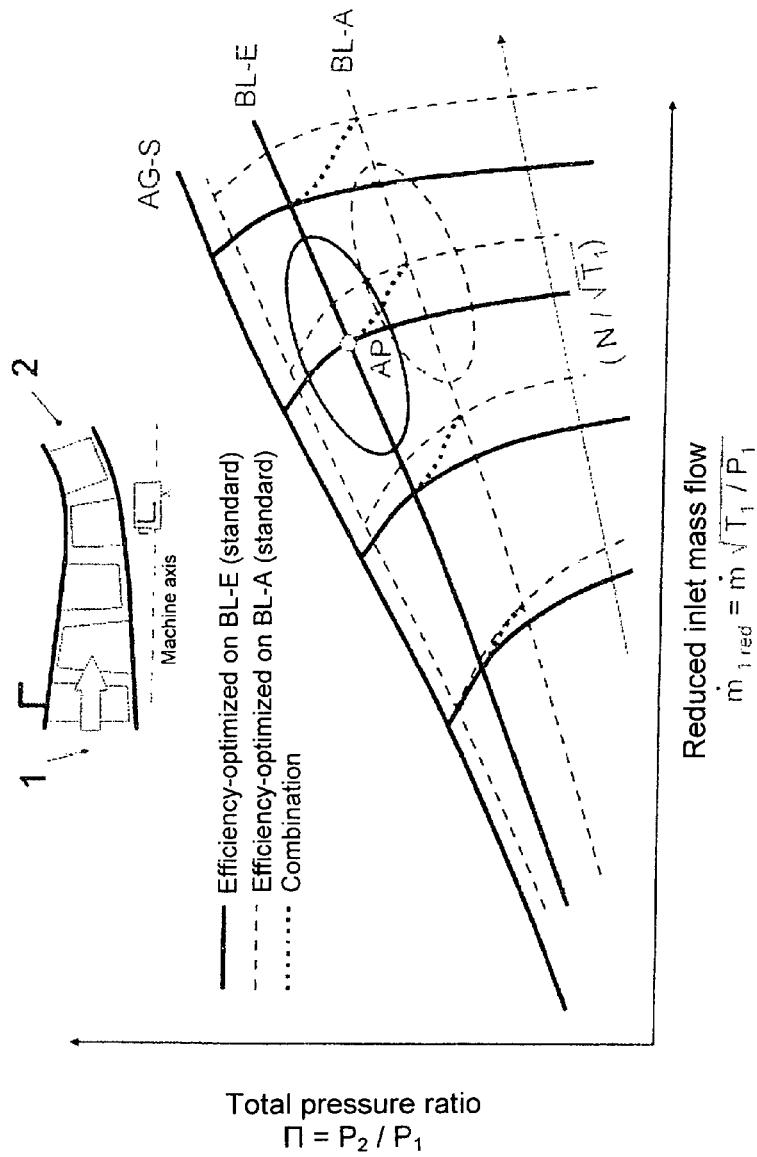
Fig. 4a: Further solution according to the present invention, family of characteristics

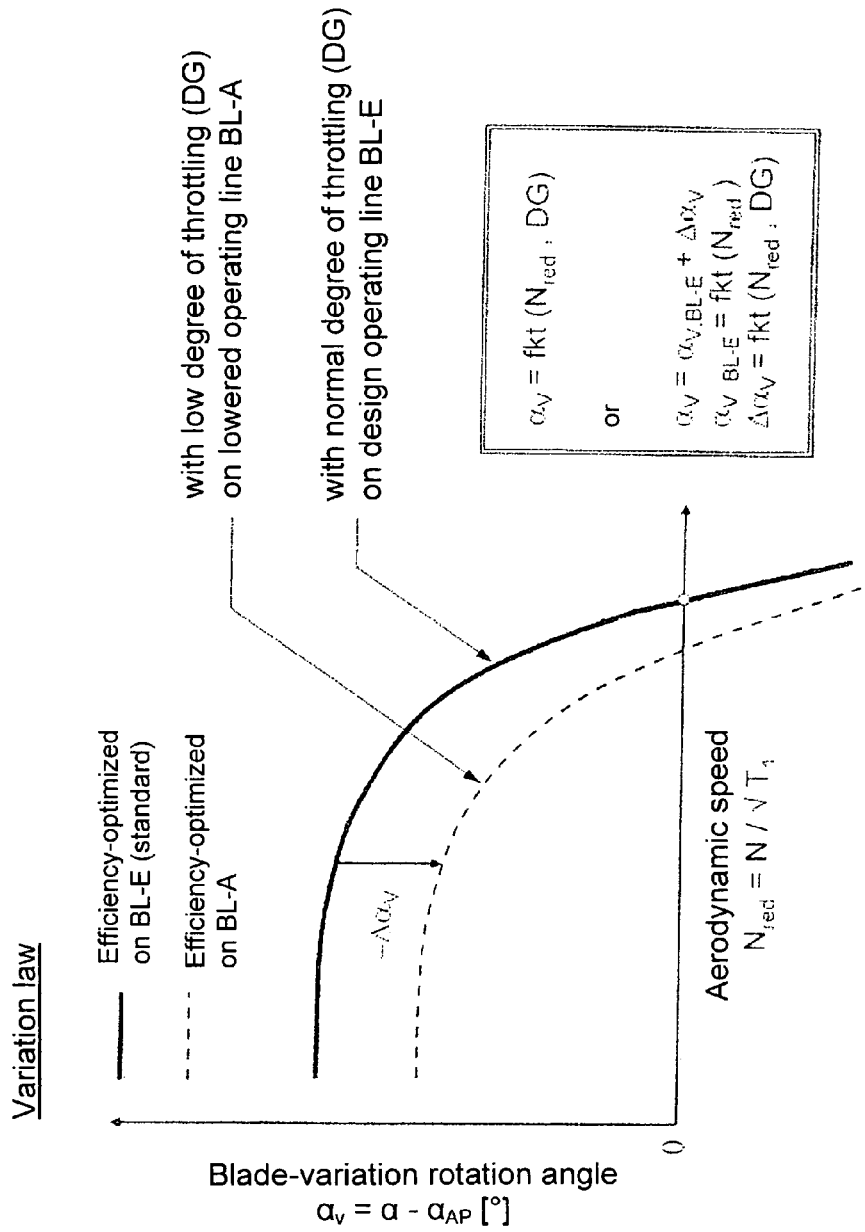
Fig. 4b: Further solution according to the present invention, blade variation

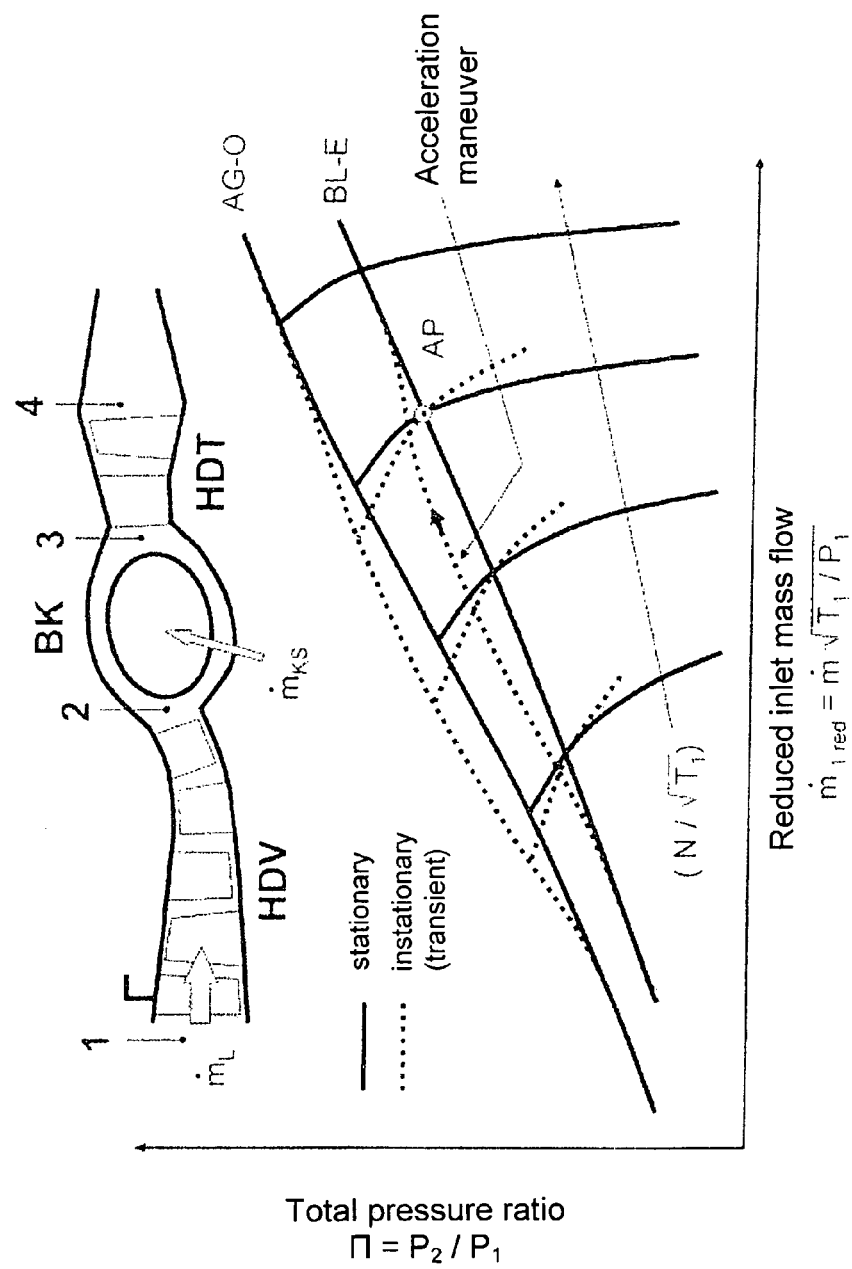
Fig. 5a: Application by way of example of a gas turbine, family of characteristics

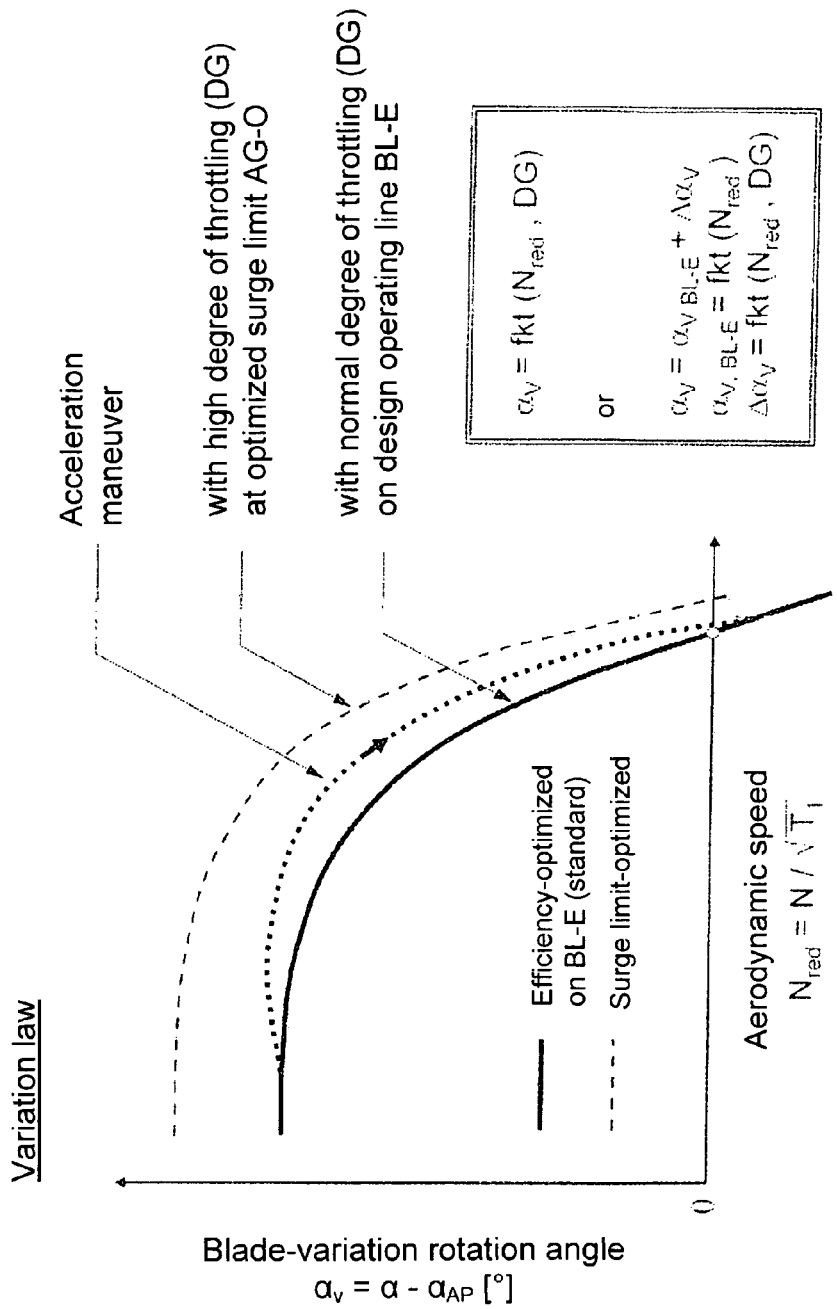
Fig. 5b: Application by way of example of a gas turbine, blade variation

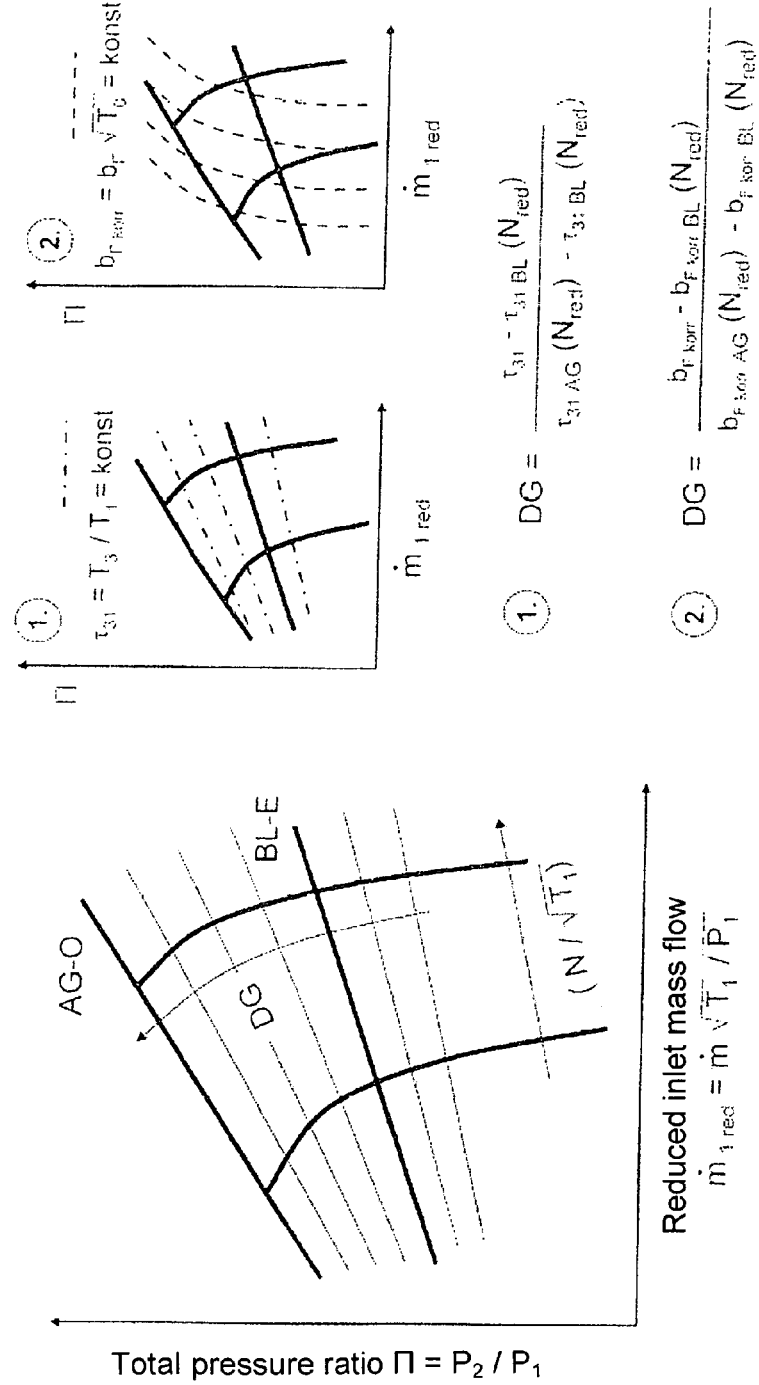
Fig. 7: Possibilities for the definition of the degree of throttling by means of operating quantities of a gas turbine

BLADE VARIATION IN DEPENDENCE OF THE DEGREE OF THROTTLING ON FLUID-FLOW MACHINE

This application claims priority to German Patent Application DE102007012119.0 filed Mar. 13, 2007, the entirety of which is incorporated by reference herein.

The present invention relates to blades of fluid-flow machines, such as blowers, compressors, pumps and fans of the axial, semi-axial and radial type using gaseous or liquid working media. The fluid-flow machine may include one or several stages, each having a rotor and a stator, in individual cases, the stage only has a rotor.

The rotor includes a number of blades, which are connected to the rotating shaft of the machine and transfer energy to the working medium. The rotor may be designed with or without shroud at the outward blade ends.

The stator includes a number of stationary blades, which may either feature a fixed or a free blade end on the hub and on the casing side.

Rotor drum and blading are usually enclosed by a casing, in other cases, e.g. aircraft or ship propellers, no such casing exists. The machine may also feature a stator, a so-called inlet guide vane assembly, upstream of the first rotor.

Departing from the stationary fixation, at least one rotor, stator or inlet guide vane assembly may be rotatably borne, to change the angle of attack. In the case of stators, variation is accomplished for example via a spindle accessible from the outside of the annulus. In an alternative configuration, multi-stage types of said fluid-flow machines may have two counter-rotating shafts, with the direction of rotation of the rotor blade rows alternating between stages. Here, no stators exist between subsequent rotors.

Finally, the fluid-flow machine may—alternatively—feature a bypass configuration such that the single-flow annulus divides into two concentric annuli behind a certain blade row, with each of these annuli housing at least one further blade row. FIG. 1 shows some possible configurations of fluid-flow machines FFM (SAM).

More particularly, the present invention relates to a novel method for the variation of the blades of a fluid-flow machine FFM (SAM).

Fluid-flow machines with multiple stages are normally provided with one or more variable blade rows. In special cases, blade variation can also be found on one-stage configurations.

FIG. 1 shows various possible configurations of fluid-flow machines which may benefit from blade variation.

To simplify the design, variability is usually provided for the inlet guide vane assembly or at least one stator row of the fluid-flow machine FFM (SAM). Off the design point, rotation of variable blades will enhance the operating behavior of the fluid-flow machine FFM (SAM) in that a higher surge limit is available in the part-load area of the family of characteristics and, at a given speed, the mass flow of the machine is capable of being changed.

Figure 2A:
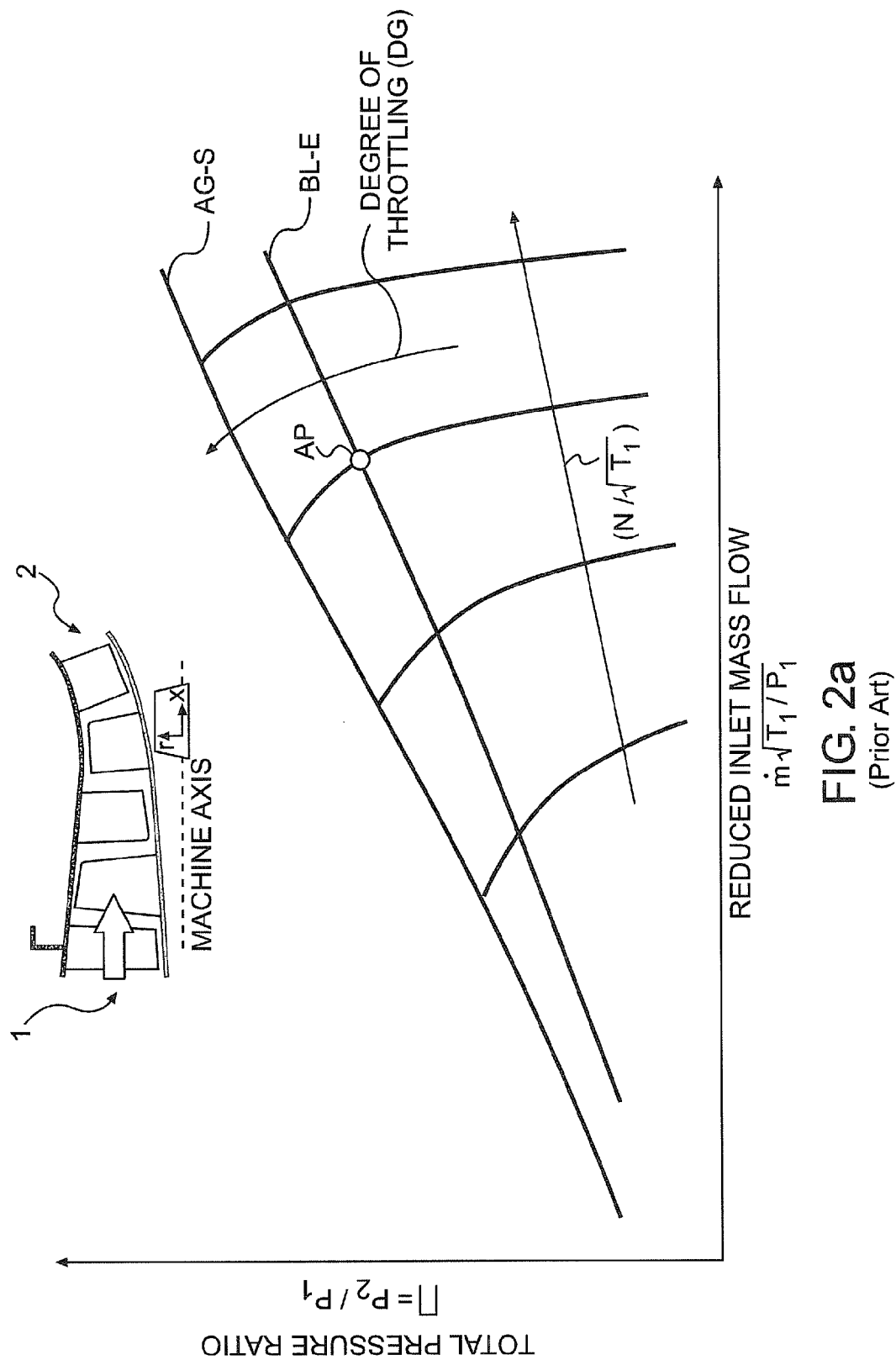

FIG. 2a shows the family of characteristics of a fluid-flow machine FFM (SAM) as plot of the total pressure ratio $\pi$ versus the reduced inlet mass flow $m_{1red}$. Station 1 designates the inlet, station 2 the outlet of the fluid-flow machine FFM (SAM).

The family of characteristics includes lines of constant aerodynamic speed, termed characteristics, which, towards the top, terminate at a surge limit AG-S (obtained with standard variation method). Also plotted are the design operating line BL-E and the design point AP, with the design point AP normally lying on the operating line. The aerodynamic speed $N_{red}=N/\sqrt{(T_1)}$ increases between characteristics from left to right. A degree of throttling, DG, increases along a characteristic from bottom to top.

Figure 2B:
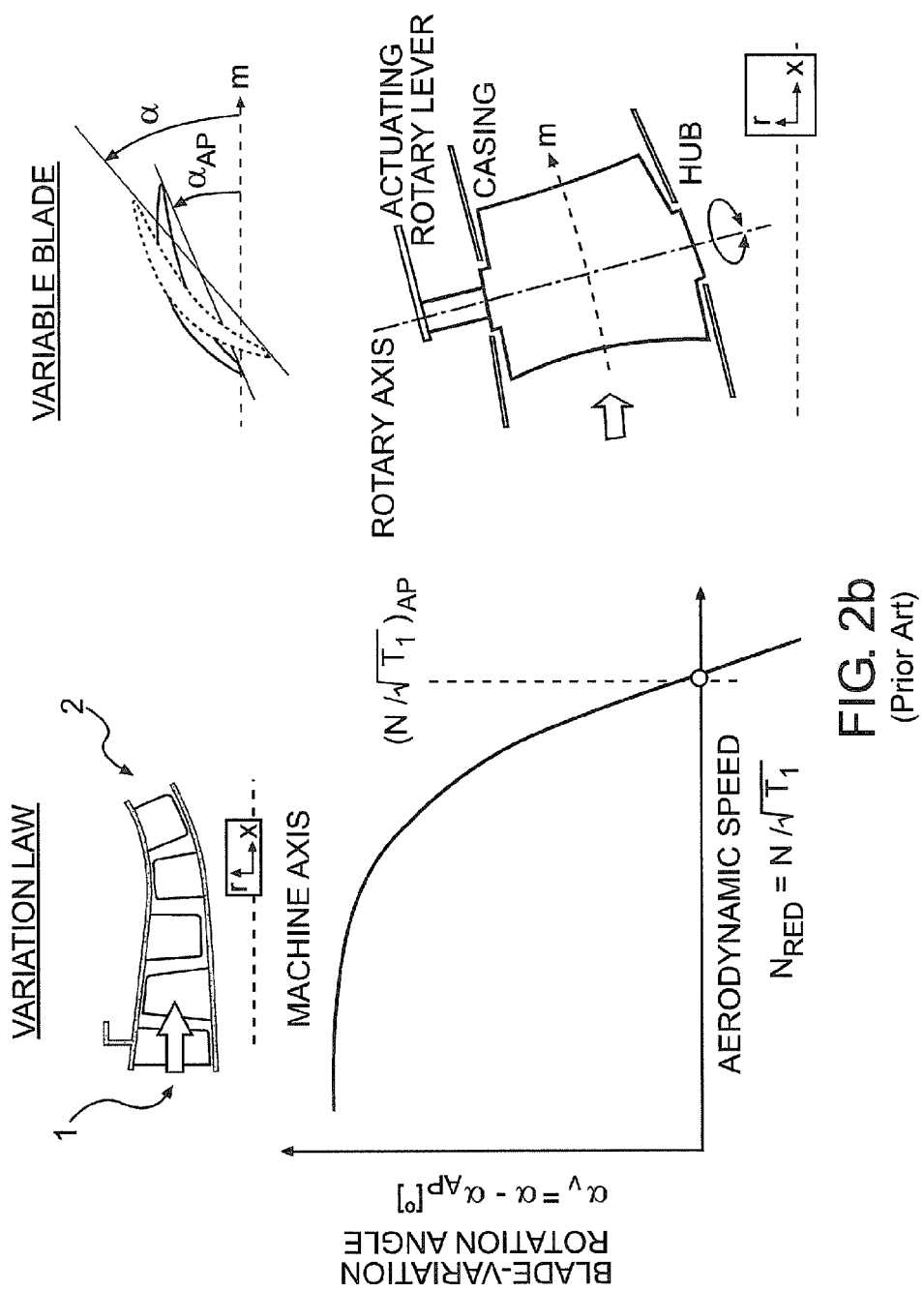

FIG. 2b shows, on the left-hand side of the illustration, a variation law according to the state of the art as plot of the blade-variation rotation angle $\alpha_v$ versus the aerodynamic speed $N_{red}$ by way of example of the inlet guide vane assembly of a two-stage fluid-flow machine FFM (SAM). Blade variation is conventionally only performed in dependence of the aerodynamic speed.

While guide blade variation devices are the state of the art, see Specification DE 42 16 033 A1, their technical potential is still widely unexploited.

Only methods for variation are known which, for example on aircraft engines, provide for a dependence on flight altitude or inlet conditions, respectively, in order to avoid mechanically critical operating points, see Specification DE 199 01 509 A1.

Also known are changes to the variation law to stabilize a gas turbine compressor upon a surge shock (so-called surge recovery). None of the existing solutions provides for optimum aerodynamic utilization of the given performance potential of a fluid-flow machine FFM (SAM).

For clarity, the illustration in FIG. 2b is, by way of example, made for an inlet guide vane assembly, but it is understood that both, a machine according to the state of the art and a machine according to the present invention may feature other or further variable blade rows (both rotor and stator), with a further variation characteristic being allocated to each row.

The left-hand side of FIG. 2b shows, by way of example, a variable stator with rotary axis and actuating rotary lever in meridional view and a flow line profile section in which the blade is shown in design position and in a position for part-load operation of the machine. As shown, the blade-variation rotation angle $\alpha_v$ used in the variation law is the result of the difference of the angles $\alpha$ and $\alpha_{AP}$.

The fact that blade variation according to the state of the art is accomplished solely in dependence of the aerodynamic speed, irrespective of the actual operating point of the machine or other pertinent quantities, limits utilization of the existing performance potential. Variation according to the state of the art only allows efficiency-related optimization for a single operating line (mostly the design operating line). The variation law so established is in no way optimal in respect of the height of the surge limit and the efficiency on other operating lines.

Specification DE 10 2004 025 628 A1 relates to a method for regulation and/or control of the variation angle of variable guide blades of a blade cascade of a compressor, in particular a high-pressure compressor of a gas turbine, especially of an aircraft engine, in which the variation angle is determined in dependence of the aerodynamic speed of the compressor according to a first law of variation. In accordance with the present invention, the variation angle is additionally determined in dependence of the mechanical speed of the compressor such that the variation angle is determined in dependence of a second law of variation when the mechanical speed of the compressor has reached a certain amount of the maximally acceptable mechanical speed, with the second law of variation generating a larger opening angle than the first law of variation.

The present invention provides a method for the variation of blades in which, besides the aerodynamic speed, at least one further quantity pertinent to the operating point of the machine is employed for control to maximize the surge limit and improve the efficiency in the case of stationary or transient departures from the design operating line.

Figure 6A:
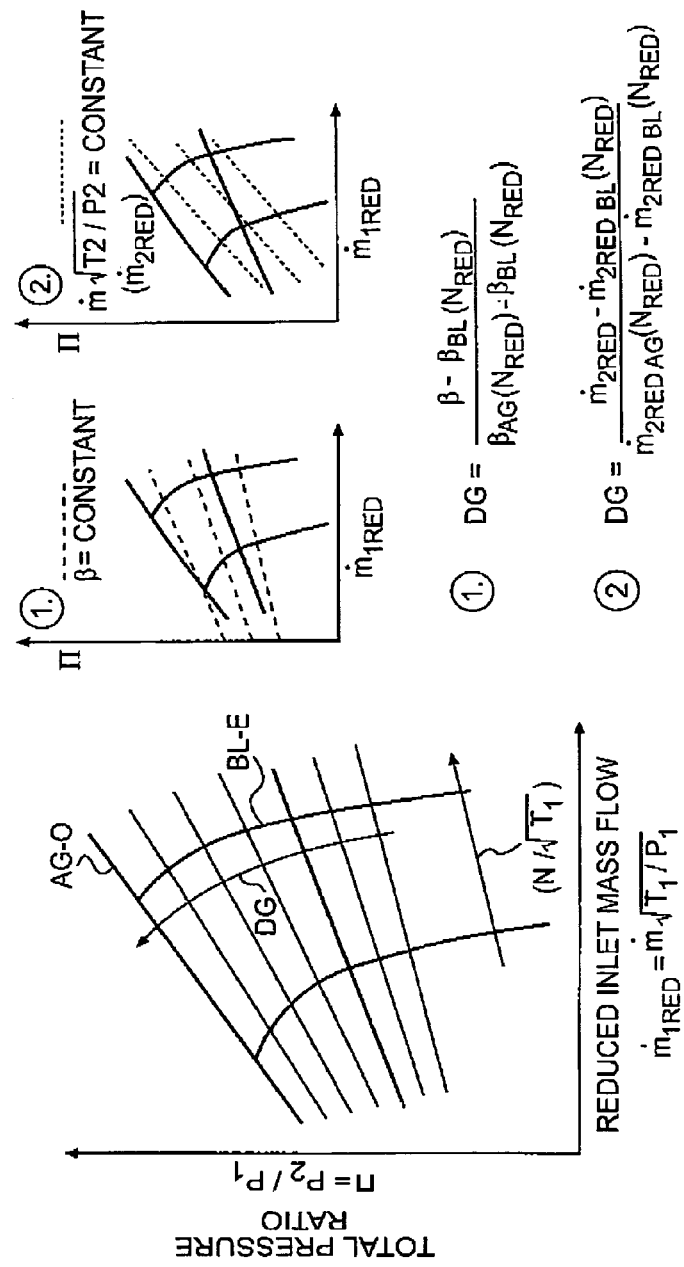
Figure 6B:
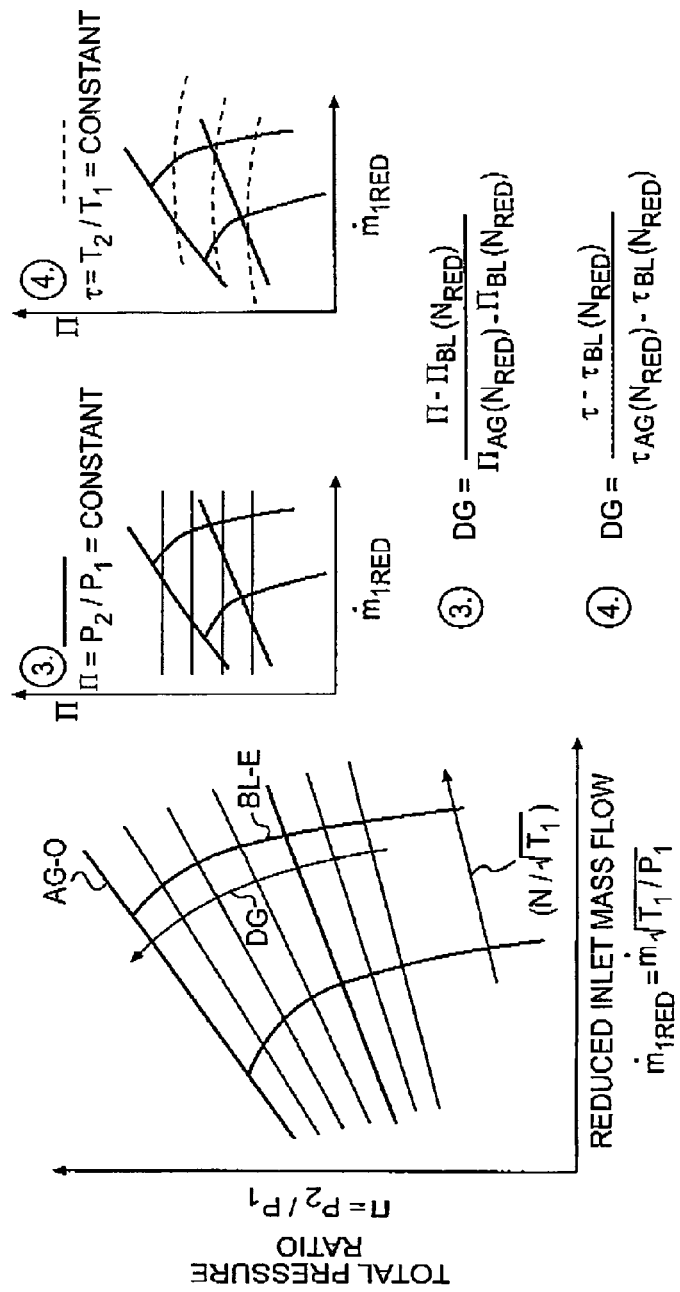
Figure 8:
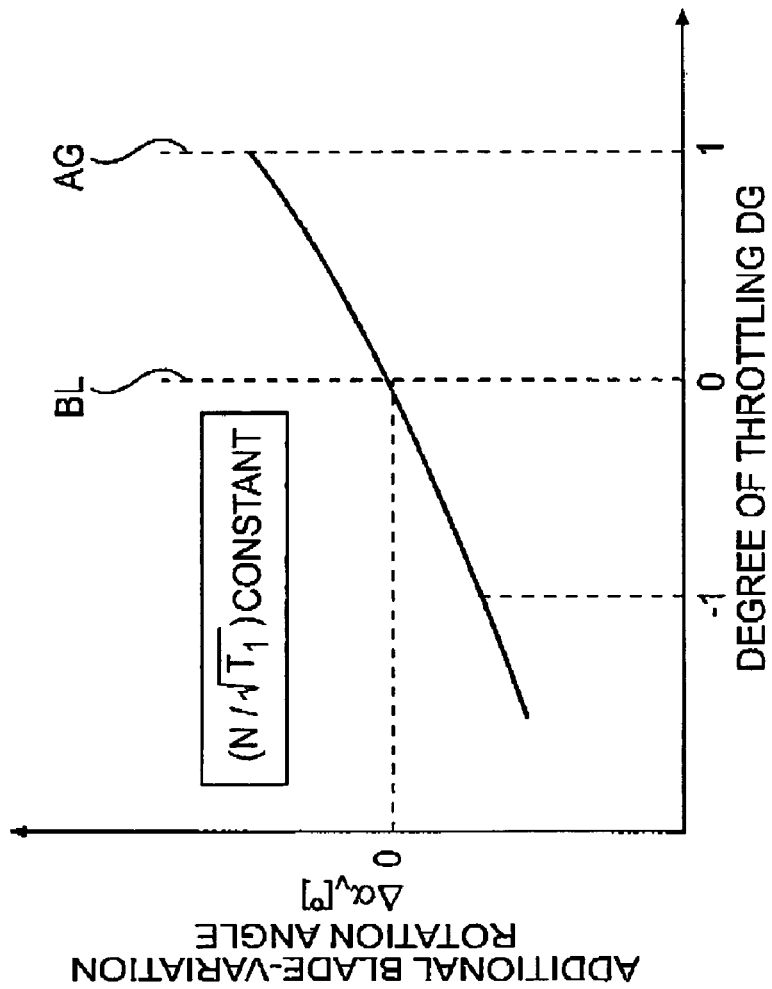

This invention is more fully described in the light of the accompanying drawings showing preferred embodiments. On the drawings, FIG. 1 shows possible configurations of fluid-flow machines pertinent to the present invention, FIG. 2a represents the state of the art, family of characteristics, FIG. 2b represents the state of the art, stator variation, FIG. 3a shows a solution according to the present invention, family of characteristics, FIG. 3b shows a solution according to the present invention, blade variation, FIG. 4a shows another solution according to the present invention, family of characteristics, FIG. 4b shows another solution according to the present invention, blade variation, FIG. 5a shows the application by way of example of a gas turbine, family of characteristics, FIG. 5b shows the application by way of example of a gas turbine, blade variation, FIG. 6a shows possibilities for the definition of the degree of throttling by means of operating quantities of the fluid-flow machine (part 1), FIG. 6b shows possibilities for the definition of the degree of throttling by means of operating quantities of the fluid-flow machine (part 2), FIG. 7 shows possibilities for the definition of the degree of throttling by means of operating quantities of a gas turbine, FIG. 8 shows the dependence of the additional blade-variation rotation angle upon the degree of throttling.

Figure 3A:
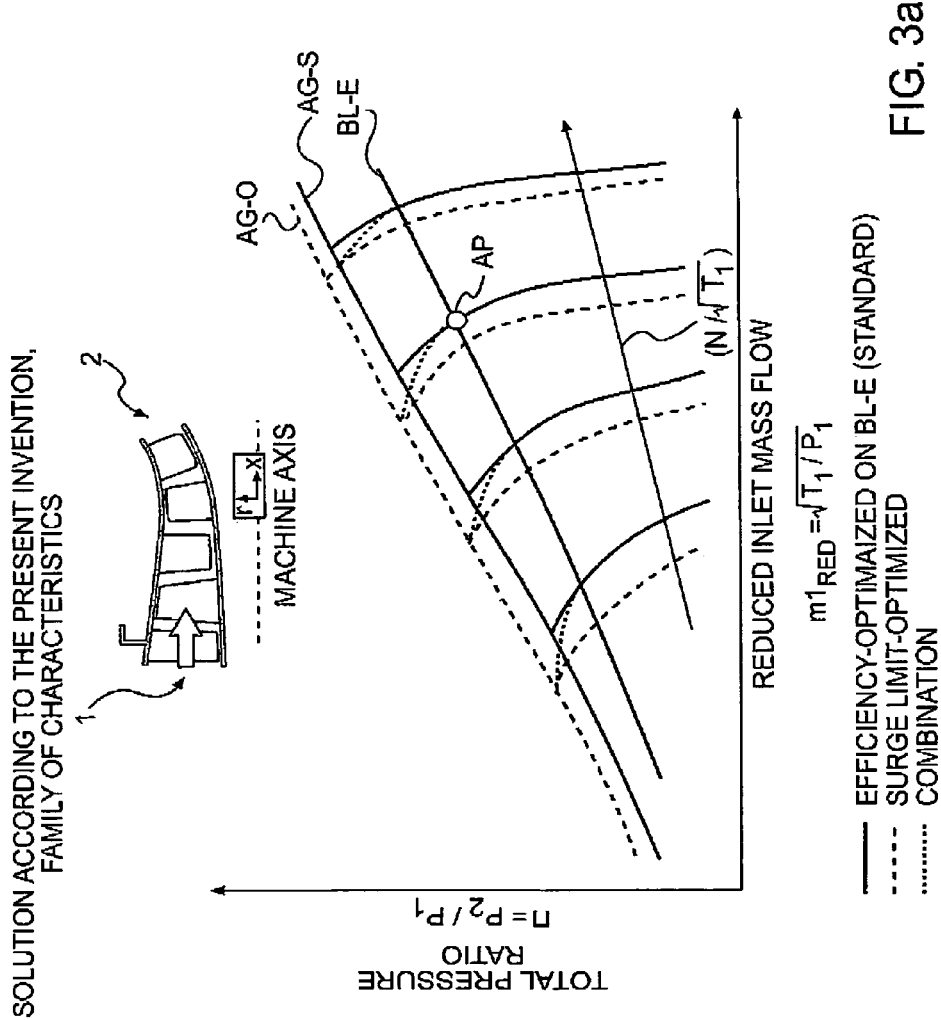

FIG. 3a shows two different families of characteristics plotted for a given fluid-flow machine FFM (SAM) with different laws of variation. The one family of characteristics (unbroken lines) is based on a conventional law of variation $\alpha_v = fkt(N_{red})$, which yields good efficiency on the design operating line BL-E. The other family of characteristics (broken lines) was oriented towards a maximum surge limit using another law of variation, again $\alpha_v = fkt(N_{red})$. Surge limit AG-O and design operating line BL-E essentially differ in the amount, or degree, of throttling of the machine.

If, as provided by the present invention, the variation of the variable blades is continuously changed between the design operating line and the surge limit in dependence of the degree of throttling, with aerodynamic speed being constant, optimum efficiency on the design operating line and maximum surge limit, or stability margin of the fluid-flow machine can be ensured. This combination of advantages according to the present invention yields the thick and dotted, more favorably developing characteristics. Moreover, machines showing inadequate stability margins with conventional variation methods can be made workable with the method according to the present invention.

FIG. 3b shows, by way of example, two developments of the law of variation (blade-variation rotation angle $\alpha_v$ as a function of aerodynamic speed $N_{red}$) for a variable inlet guide vane assembly of the machine:
a) for the design operating line, and
b) for the maximally obtainable surge limit.

In accordance with the present invention, the difference $\Delta\alpha_v$ between the two curves can vary freely with the aerodynamic speed $N_{red}$. The dependence of the blade-variation rotation angle $\alpha v$ on the degree of throttling can be either linear or non-linear at a given aerodynamic speed.

According to the present invention there are two approaches as regards the realization of the novel law of variation:

a) Relation of the degree of throttling to a freely selected reference line in the family of characteristics of the fluid-flow machine, for example a line at $\pi=1$ and, consequently, blade variation by control in direct dependence of the aerodynamic speed and the degree of throttling so defined:

$$\alpha_v = fkt(N_{red}, DG)$$

b) Relation of the degree of throttling to the design operating line of the fluid-flow machine, with blade variation by control in incremental dependence such that a basic blade variation by conventional control of the blade-variation rotation angle in dependence of the aerodynamic speed is accomplished and that further, at a given aerodynamic speed, a correction of the variation angle in dependence of the degree of throttling is added:

$$\alpha_v = \alpha_{v,BL-E} + \Delta\alpha_v$$

$$\alpha_{v,BL-E} = fkt(N_{red})$$

$$\Delta\alpha_v = fkt(N_{red}, DG)$$

Similar to FIG. 3a, FIG. 4a shows two different families of characteristics plotted for a given fluid-flow machine with different laws of variation. The one family of characteristics (unbroken lines) is based on a conventional law of variation $\alpha_v = fkt(N_{red})$ which yields good efficiency on the design operating line BL-E. An annular efficiency line is included to illustrate the position of the maximum. The other family of characteristics (broken lines) was oriented towards best efficiency on a lowered (depressed) operating line BL-A using another law of variation, again $\alpha_v = fkt(N_{red})$. The design operating line BL-E and the lowered operating line BL-A essentially differ in the amount, or degree, of throttling of the machine.

If, as provided by the present invention, the variation of the variable blades is continuously changed between the design operating line and the lowered operating line in dependence of the degree of throttling, with aerodynamic speed being constant, optimum efficiency in a further area of the family of characteristics can be ensured. This combination according to the present invention yields the thick and dotted, more favorably developing characteristics.

FIG. 4b shows, by way of example, two developments of the law of variation (blade-variation rotation angle $\alpha_v$ as a function of aerodynamic speed $N_{red}$) for a variable inlet guide vane assembly of the machine:
a) for the design operating line, and
b) for a lowered operating line.

In accordance with the present invention, the difference $\Delta\alpha_v$ between the two curves can vary freely with the aerodynamic speed. The dependence of the blade-variation rotation angle $\alpha_v$ on the degree of throttling can be either linear or non-linear at a given aerodynamic speed.

According to the present invention, the two approaches explained in connection with FIG. 3b here apply as well, as regards the realization of the novel law of variation.

FIG. 5a shows the inventive method for variation of stators by way of example of a compressor of a gas turbine or an aircraft engine. The gas turbine, which at least includes the components high-pressure compressor HPC (HDV), combustion chamber CC (BK) and high-pressure turbine HPT (HDT), is schematically shown in the upper part of the illustration, with the major inlet and outlet stations of the components being numbered. In stationary operation or with very slow operating point changes, the compressor is run on the operating line BL indicated. If the gas turbine or the aircraft engine is accelerated, the compressor operates above the stationary operating line BL for the time of the acceleration maneuver, with normally clearly reduced distance between the surge limit and the actual operating line, i.e. smaller stability margin. If the inventive method for variation of the stators in dependence of the degree of throttling is applied, the operating line and the surge limit will be synchronously raised. Compared with the standard variation method, the present invention will allow the stability margin to be largely maintained also during transient maneuvers.

The method according to the present invention is, of course, also applicable to an intermediate-pressure compressor, which may be arranged upstream of the high-pressure compressor on an aircraft engine and must be operated above its stationary operating line during deceleration.

FIG. 5b schematically shows the course of the blade-variation rotation angle during an acceleration maneuver as applicable to the high-pressure compressor.

The term degree of throttling, as defined so far, only describes how much to the left (towards small reduced inlet mass flows $m_{1\,red}$) or to the top (towards large pressure ratios $\pi$) a fluid-flow machine is operated on a characteristic, or at which distance to a given surge limit the fluid-flow machine is operated on a characteristic. The exact formula definition of the degree of throttling may, according to the present invention, take different forms, with the most useful formula definition depending on the concrete application of the fluid-flow machine and the operating quantities available in terms of measurement and control technology. Various definitions of the degree of throttling as applicable to the specific case are provided. They fall into two categories:

Category 1: Definition by means of operating quantities of the fluid-flow machine FFM (SAM) itself, i.e. its inlet and outlet quantities (pressure, temperature), mass flow and rotational speed.

Category 2: Definition by means of operating quantities of a gas turbine (e.g. of an aircraft engine), i.e. the inlet and outlet quantities, mass flows, rotational speeds of other components.

With regard to category 1, those quantities are particularly favorable for the description of the degree of throttling (see FIG. 6a, left) whose contour lines (isolines) in the field of characteristics of the fluid-flow machine FFM (SAM) are largely transverse to the characteristics over greatest possible portions of the characteristics (lines of constant aerodynamic speed) and whose change along a characteristic is thus relatively uniform, see FIGS. 6a, b. A first favorable quantity here is the so-called β-value, see FIG. 6a, top, center. Lines of constant i-values have their origins in the field of characteristics at $\pi=1$ and $m_{red}=0$ according to an arbitrary definition and cover the entire area of the field of characteristics as an array of straight lines. If β-values are available, the degree of throttling can, according to the present invention, be defined as follows, using the respective aerodynamic speed-dependent values on the operating line BL and at the surge limit AG:

$$DG = \frac{\beta - \beta_{BL}(N_{red})}{\beta_{AG}(N_{red}) - \beta_{BL}(N_{red})}$$

Another favorable quantity is the reduced outlet mass flow $m_{2red}$ of the fluid-flow machine FFM (SAM), see FIG. 6a, top, right. Lines of constant reduced outlet mass flow extend at large angles to the characteristics. If values of reduced outlet mass flow are available, the degree of throttling can, according to the present invention, be defined as follows:

$$DG = \frac{\dot{m}_{2red} - \dot{m}_{2redBL}(N_{red})}{\dot{m}_{2redAG}(N_{red}) - \dot{m}_{2redBL}(N_{red})}$$

A further usable quantity is the total pressure ratio $\pi$ of the fluid-flow machine FFM (SAM), see FIG. 6b, top, center. Lines of constant total pressure ratio extend horizontally in the family of characteristics. If characteristics are very flat, $\pi$ may be an unfavorable quantity for determining the degree of throttling. If $\pi$-values are available, the degree of throttling can, according to the present invention, be defined as follows:

$$DG = \frac{\prod - \prod_{BL}(N_{red})}{\prod_{AG}(N_{red}) - \prod_{BL}(N_{red})}$$

Another usable quantity is the total temperature ratio $\tau$ of the fluid-flow machine FFM (SAM), see FIG. 6b, top, right. Lines of constant total temperature ratio extend also flat in the family of characteristics. If characteristics are very flat, $\tau$ may be an unfavorable quantity for determining the degree of throttling. If $\tau$-values are available, the degree of throttling can, according to the present invention, be defined as follows:

$$DG = \frac{\tau - \tau_{BL}(N_{red})}{\tau_{AG}(N_{red}) - \tau_{BL}(N_{red})}$$

With regard to category 2, those quantities are particularly favorable for the description of the degree of throttling, whose contour lines (isolines) are on the one hand clearly representable in the family of characteristics of the fluid-flow machines, independent of the environmental conditions, and on the other hand, are largely transverse to the characteristics over greatest possible portions of the characteristics (lines of constant aerodynamic speed) and whose change along a characteristic is thus relatively uniform, see FIG. 7. A first favorable quantity here is the turbine inlet temperature T3 or the quotient $\tau 31$ from turbine inlet temperature and inlet temperature T1 of the fluid-flow machines, see FIG. 7, top, center. Lines of constant $\tau 31$-values extend at large angles to the characteristics. If $\tau 31$-values are available, the degree of throttling can, according to the present invention, be defined as follows:

$$DG = \frac{\tau_{31} - \tau_{31BL}(N_{red})}{\tau_{31AG}(N_{red}) - \tau_{31BL}(N_{red})}$$

A further usable quantity is the corrected thrust-specific fuel mass flow $b_{F\,korr} = b_F \sqrt{(T_0)}$, see FIG. 7, top, right. To is here the ambient temperature. Lines of constant values of $b_{F\,korr}$ extend rather steeply in the family of characteristics and, therefore, may be unfavorably inclined towards the lower portions of the characteristics. If values of the corrected thrust-specific fuel mass flow are available, the degree of throttling can, according to the present invention, be defined as follows:

$$DG = \frac{b_{Fkorr} - b_{FkorrBL}(N_{red})}{b_{FkorrAG}(N_{red}) - b_{FkorrBL}(N_{red})}$$

Finally, it may be particularly favorable according to the present invention to define the degree of throttling via a freely definable function using the time rate of change of the fuel mass flow, DKDT=d ($m_{KS}$)/d t, or the time rate of change of the shaft torque of the respective component, DMDT=dM/dt:

$DG=fkt(N_{red}, DKDT)$ or $DG=fkt(N_{red}, DMDT)$.

The definitions given in the above for Category 1 and Category 2 provide for variation of the degree of throttling between the value 1 at the surge limit and the value 0 on the design operating line. Operation below the design operating line results in degrees of throttling less than 0.

FIG. 8 shows, by way of example, a predictable dependence, in accordance with the present invention, of the additional blade-variation rotation angle $\Delta\alpha_V$ upon the degree of throttling for a defined aerodynamic speed $N_{red}$. The actual development depends on the fluid-flow machine FFM (SAM) and must be determined experimentally, or also by computational simulation, for each individual aerodynamic speed.

Also inventive, but not further described because of the strict analogy to what has been said before, is a relation of the degree of throttling to any other line departing from the design operating line in the family of characteristics of the fluid-flow machines, for example a line at the bottom margin at $\pi$=1. This presents itself particularly where control of the blade-variation rotation angle, as already mentioned before, is to be accomplished directly, and not incrementally to a basic law of variation.

The present invention provides for an operation of a fluid-flow machine with improved efficiency and stability. Application of the concept to the high-pressure compressor of an aircraft engine with approx. 25,000 lbs thrust leads to a reduction of the specific fuel consumption by up to 0.5%.

What is claimed is:

1. A method for controlling a fluid-flow machine, comprising:
controlling an angle of attack of at least one variable blade row of the fluid-flow machine based on both an aerodynamic speed and at least one further quantity pertinent to a position of an actual operating point in a family of characteristics of the fluid-flow machine;
setting a degree of throttling of the at least one variable blade row based on the operating point at a given aerodynamic speed;
defining the degree of throttling based on at least one factor from the following group of factors, consisting of:
a β-value of the fluid-flow machine, the β-value being a line from a β map;
a value of a reduced outlet mass flow of the fluid-flow machine;
a value of a total temperature ratio of the fluid-flow machine;
a value of a total temperature ratio of a gas turbine;
a value of a corrected thrust-specific fuel mass flow of a gas turbine; and
a function of a time rate of change of a fuel mass flow DKDT =d($m_{KS}$)/d t of a gas turbine.

2. The method of claim 1, wherein the at least one variable blade row is at least one of an inlet guide vane assembly and a stator row of a fluid-flow machine.

3. The method of claim 1, and further comprising controlling the angle of attack during steady state operation of the fluid-flow machine.

4. The method of claim 1, and further comprising controlling the angle of attack during transient operation of the fluid-flow machine.

5. The method of claim 1, and further comprising relating the degree of throttling to a design operating line of the fluid-flow machine and controlling blade variation in incremental dependence as per $\alpha_v = \alpha_{vBL-E} + \Delta\alpha_v$ such that a basic blade variation is effected by controlling a blade-variation rotation angle in dependence of the aerodynamic speed in the form of $\alpha_{vBL-E}$=fkt($N_{red}$) and that further, at a given aerodynamic speed, a correction of the variation rotation angle in dependence of the degree of throttling in the form of $\Delta\alpha_{v=fkt}$($N_{red}$,DG) is added.

6. The method of claim 5, wherein the degree of throttling is defined by the β-value of the fluid-flow machine as per $$DG = \frac{\beta - \beta_{BL}(N_{red})}{\beta_{AG}(N_{red}) - \beta_{BL}(N_{red})}.$$

7. The method of claim 5, wherein the degree of throttling is defined by the value of the reduced outlet mass flow of the fluid-flow machine as per $$DG = \frac{\dot{m}_{2red} - \dot{m}_{2redBL}(N_{red})}{\dot{m}_{2redAG}(N_{red}) - \dot{m}_{2redBL}(N_{red})}.$$

8. The method of claim 5, wherein the degree of throttling is defined by the value of the total temperature ratio of the fluid-flow machine as per $$DG = \frac{\tau - \tau_{BL}(N_{red})}{\tau_{AG}(N_{red}) - \tau_{BL}(N_{red})}.$$

9. The method of claim 5, wherein the degree of throttling is defined by the value of the total temperature ratio of a gas turbine as per $$DG = \frac{\tau_{31} - \tau_{31BL}(N_{red})}{\tau_{31AG}(N_{red}) - \tau_{31BL}(N_{red})}.$$

10. The method of claim 5, wherein the degree of throttling is defined by the value of the corrected thrust-specific fuel mass flow of a gas turbine as per $$DG = \frac{b_{Fkorr} - b_{FkorrBL}(N_{red})}{b_{FkorrAG}(N_{red}) - b_{FkorrBL}(N_{red})}.$$

11. The method of claim 5, wherein the degree of throttling is defined by the function of the time rate of change of the fuel mass flow DKDT=d($m_{KS}$)/d t of a gas turbine as per DG=fkt($N_{red}$, DKDT).

12. The method of claim 1, and further comprising defining the degree of throttling based on at least two factors from the group of factors.

13. The method of claim 1, and further comprising defining the degree of throttling based on at least three factors from the group of factors.

14. The method of claim 1, and further comprising defining the degree of throttling based on at least four factors from the group of factors.

15. The method of claim 1, and further comprising defining the degree of throttling based on at least five factors from the group of factors.

16. The method of claim 1, and further comprising defining the degree of throttling based on at least six factors from the group of factors.

* * * * *